United States Patent

Danico

[11] Patent Number: 5,505,324
[45] Date of Patent: Apr. 9, 1996

[54] HOLE CLOSURE

[75] Inventor: Henry F. Danico, Stoneham, Mass.

[73] Assignee: TRW, Inc., Cleveland, Ohio

[21] Appl. No.: 452,308

[22] Filed: May 26, 1995

[51] Int. Cl.⁶ .................................................. B65D 55/00
[52] U.S. Cl. ........................ 220/201; 220/307; 220/315; 220/359
[58] Field of Search ........................... 215/14, 201, 263, 215/355, 358, 362, 364; 220/201, 287, 307, 315, 359

[56] References Cited

U.S. PATENT DOCUMENTS

| 1,753,631 | 4/1930 | Walters ................................. 220/307 |
| 3,944,107 | 3/1976 | Wallace et al. . |
| 3,990,604 | 11/1976 | Barnett et al. ........................ 220/307 |
| 4,094,436 | 6/1978 | Birmingham . |
| 4,290,536 | 9/1981 | Morel . |
| 4,363,420 | 12/1982 | Andrews . |
| 4,391,384 | 7/1983 | Moore, III et al. . |
| 4,560,083 | 12/1985 | Danico . |
| 5,224,624 | 7/1993 | Kraus ................................... 220/201 |
| 5,267,667 | 12/1993 | Cozzani ................................. 220/307 |

FOREIGN PATENT DOCUMENTS 734857  8/1955  United Kingdom .................. 220/307

Primary Examiner—Stephen P. Garbe
Assistant Examiner—Stephen Cronin
Attorney, Agent, or Firm—Fay, Sharpe, Beall, Fagan, Minnich & McKee

[57] ABSTRACT

A hole plug for closing an opening in a panel member comprises a rigid, disk-like main body for positioning in overlying relationship with the opening. Resilient retaining legs are carried by the main body for extending through the opening and engaging the edges thereof for maintaining the main body in the overlying relationship. A mass of heat expandable resilient material is carried by the main body at a location adjacent the retaining legs. The heat expandable resilient material is selected so as to be capable of being expanded through the application of heat to permanently extend from the main body a distance greater than the legs to thereby act as a shield to prevent undesired contact between the legs and associated structure.

16 Claims, 2 Drawing Sheets

HOLE CLOSURE

BACKGROUND OF THE INVENTION

The subject invention is directed toward the art of hole plugs or closures and, more particularly, to a plug especially intended for use in closing a hole in a vehicle body panel.

During the manufacture of vehicle bodies, holes are provided at various locations in panels and structural members to allow excess paint or coatings to drain therefrom. The holes are normally filled with suitable plugs after the painting operation and prior to passage of the bodies through the curing ovens.

Many different hole plugs are known in the prior art. The plugs typically comprise a disk-like main body provided with retaining elements that extend through the hole being sealed to hold the plug in position.

The subject invention provides an improved plug design that protects surrounding structure, as well as personnel, from undesired contact with the retaining elements.

SUMMARY OF THE INVENTION

In accordance with one aspect of the invention, there is provided a hole plug which is particularly intended for use in closing an opening in a vehicle body or panel member. The hole plug generally comprises a disk-like main body for positioning in overlying relationship with the opening to be closed. Resilient retaining legs are carried from the main body to extend through the opening and engage the sides of the opening for maintaining the main body in the overlying relationship. The legs extend from the main body a maximum distance D. Also carried by the main body at a location adjacent the retaining legs is a mass of heat expandable resilient material. The heat expandable resilient material is capable of being expanded through the application of heat to permanently extend from the main body a distance greater than D.

The heat expandable mass of material is normally activated by passage of the vehicle body through the paint curing oven. When activated to its expanded condition, the mass of resilient material extends outwardly to a position wherein inadvertent and undesired contact with the retaining legs is greatly reduced. This is an advantage not only in preventing contact by personnel, but also in preventing engagement of the ends of the legs with associated vehicle structure.

Preferably, and in accordance with a more limited aspect of the invention, there is a resilient heat activated sealer gasket carried on the main body. The gasket is arranged so as to be caused to flow at approximately the same temperature as required to produce expansion of the heat expandable mass.

In order to reduce the amount of expandable material required, it is preferably that the center of the main body of the plug be dished in the direction of the retaining legs and that the mass of heat expandable material be carried on the dished portion.

The versatility of the plug can be increased by providing the retaining legs with a plurality of retaining tabs located at different distances from the main body so that the plugs can be used in openings having a surrounding collar portion as well as openings formed in flat sheet material without a collar.

As can be seen from the foregoing, a primary object of the invention is the provision of a hole plug device wherein resilient material is positioned so as to prevent engagement between the hole plugs retaining legs and associated structures of the vehicle.

Yet another object is the provision of a hole plug of the general type described which is versatile and capable of being used in a variety of different hole arrangements.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
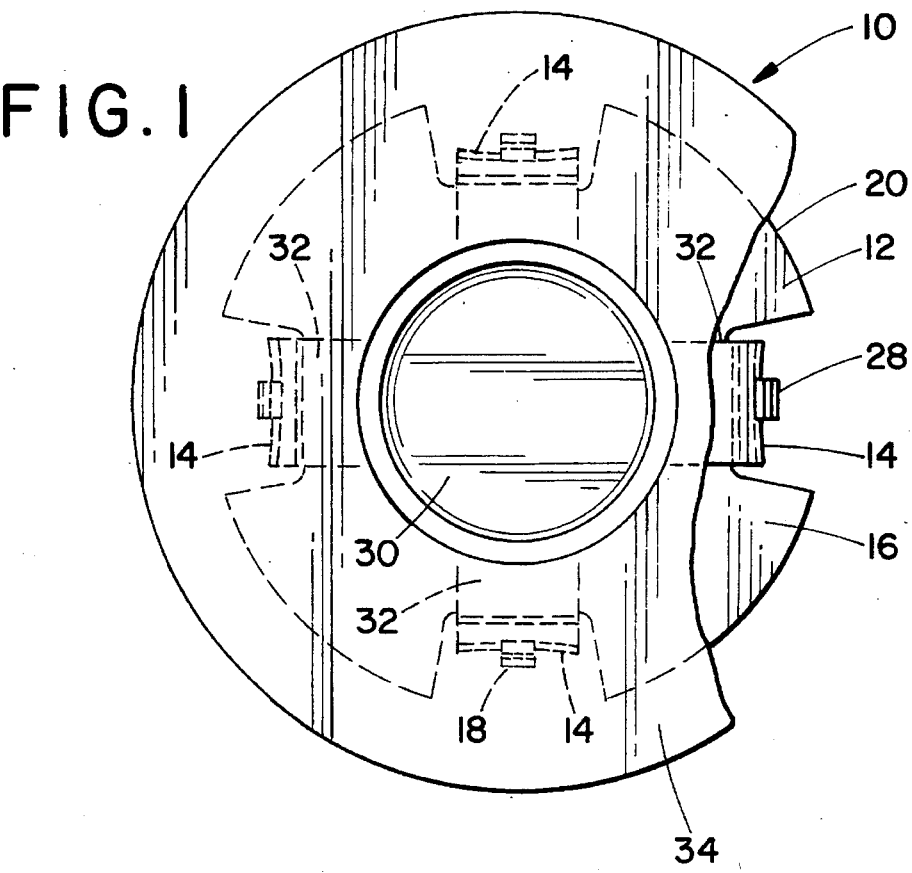
FIG. 1 is a plan view of a preferred form of a hole plug formed in accordance with the subject invention (a portion of the seal structure has been cut away to show details of construction more clearly)
Figure 2:
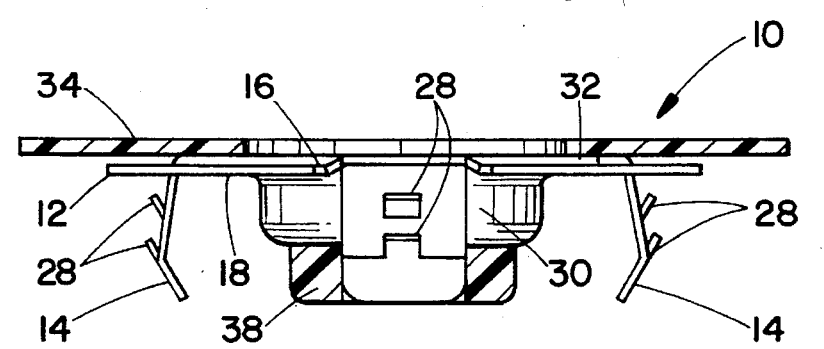
FIG. 2 is a side elevational view, partially in cross section, of the plug of FIG. 1.
Figure 3:
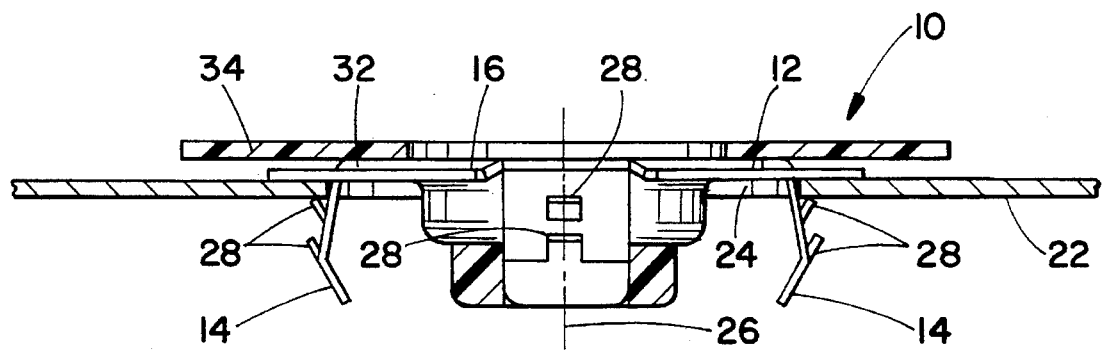
FIG. 3 is a view showing the plug of FIG. 1 inserted in a panel opening but prior to passage through a paint curing oven.

Referring now to the drawings wherein the showings are for the purposes of illustrating the preferred embodiment of the invention only and not for purposes of limiting same, FIGS. 1 through 3 show the overall arrangement of the hole plug 10 as comprising a generally circular, disk-like main body 12 carrying retaining legs 14 extending therefrom. In the subject embodiment, the main body 12 is stamped from a relatively rigid sheet metal such as steel and has a first or top surface 16 and a second or bottom surface 18. The opposed surfaces 16 and 18 are joined by a peripheral edge 20 which is sized and shaped so as to extend radially outward to a position beyond the peripheral edge of the opening to be closed.

The number and positioning of the retaining legs could vary widely but the subject embodiment includes four retaining legs 14 which are spaced relatively uniformly about the main body. As can be appreciated, and as best seen in FIG. 3, the legs are located so as to be capable of engaging about the interior of the opening which the plug is intended to close. As shown in FIG. 3, a panel member 22 is provided with a circular opening 24. The legs 14 of this embodiment are thus located to engage with the peripheral edge of the opening 24.

Figure 5:
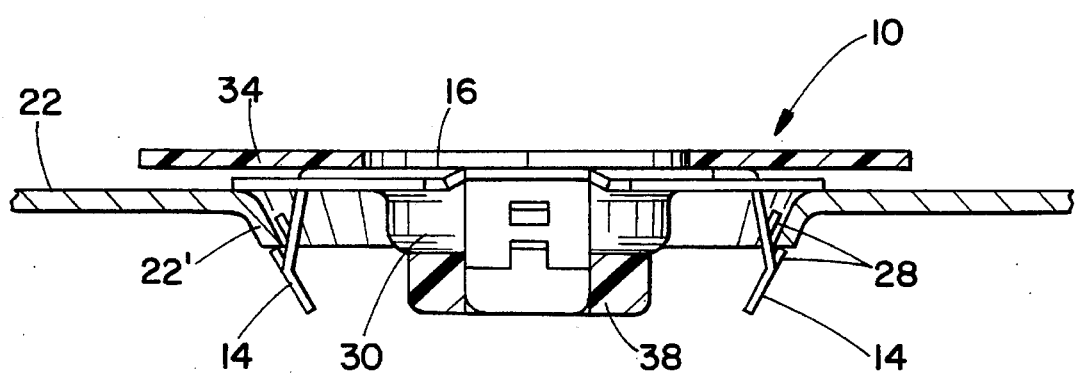

In the preferred embodiment, the legs 14 are formed integrally with the main body 16 and extend nearly perpendicularly from the face 18. Additionally, it is preferably if each of the legs 14 be formed to have lateral resiliency to enable them to resiliently engage the edge of the opening 24. The lower ends of the leg are preferably bent slightly inwardly in a radial direction toward the center axis so as to allow them to engage the edge of the opening and deflect radially inward during insertion into the opening 24. It should be noted that each of the legs include angled retaining tabs 28. The tabs 28 are preferably stamped from the main body of the legs and deflected outwardly to the position shown. In the preferred form, there are two tabs 28 on each leg 14 with the tabs located at different distances from the second surface 18. This allows the plug to be used in a thin panel opening such as shown in FIG. 3 or a collared opening as shown in FIG. 5. Note that the first retaining tab 28 having its position closest to the surface 18 can adequately engage under a thin non-collared opening as that shown in FIG. 3. Alternatively, the tabs located at the greatest distance from the surface 18 can be positioned to engage about the end of the collar 22' as shown in FIG. 5. Other tab arrangements could be provided to allow engagement in panels of different thicknesses or having different collar arrangements.

It should be noted that the main body 12 is preferably provided with a circular, dished center portion 30 which is somewhat cup-like and extends downwardly relative to the lower surface 18. Also, it is preferred that the main body be deflected upwardly in narrow bands 32 aligned with legs 14 and extending between the dished center portion 30 and the base of legs 14. This acts to provide additional rigidity to the main body.

Figure 4:
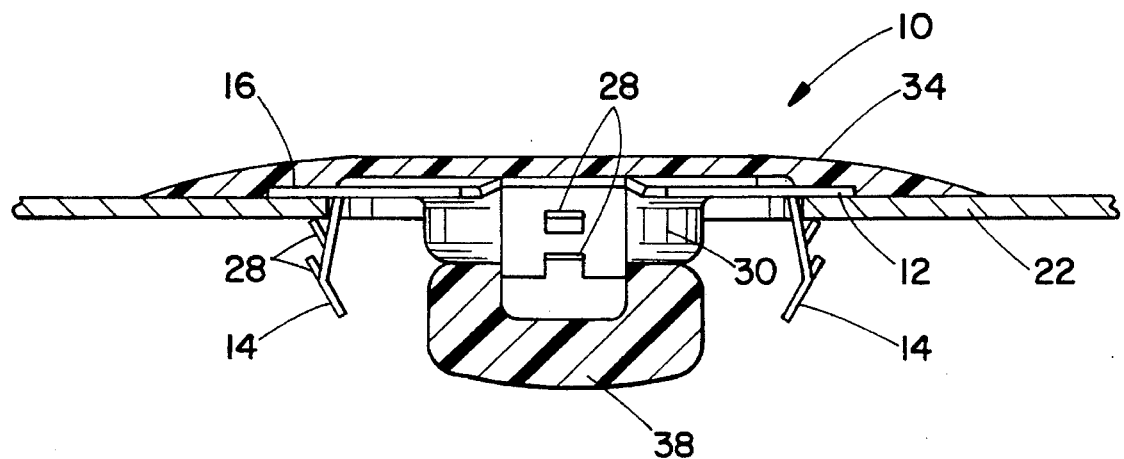
FIG. 4 is a view like FIG. 3 but showing the plug after passage through the paint curing oven; and, FIG. 5 is a view like FIG. 3 but showing the plug mounted in a collared opening.

Carried on the upper or first surface 16 of the main body 12 is an annular disk 34 of a sealant material that has the property of flowing when heated to a predetermined temperature. Many different types of sealant materials can be used for this purpose and suitable materials are well known in the art. For example, an EVA material (ethylene vinyl acetate) can be compounded to flow at a variety of temperatures. Further, for example, the normal temperature in a paint curing oven is somewhere in the range of from 140° to 170° C. and a suitable flow point for the EVA material can be from 100° to 135° C. Many other materials could be used as the sealant, for example, soft polyethylene. If desired, thermosetting materials could be used. Other materials provided with a blowing agent could also be used as the sealant. In any event, such materials are well known and widely used in the art, and whatever the material used, it should be selected such that when it is heated to the predetermined temperature level, it will flow and adhere to the surrounding panel as shown in FIG. 4 to provide a tight seal between the plug and the panel.

Of particular importance to the subject invention is the provision of a mass of heat expandable resilient material located on the second or underside surface of the main body 12. As illustrated, a mass 38 is heat staked or otherwise firmly bonded to the bottom of the dished center portion 30 at a location intermediate the legs 14. The mass of material is sized and arranged so that when expanded, it extends outwardly as shown in FIG. 4 to a location beyond the ends of the legs 14. Here again, many different materials could be used for the mass 38. Suitable materials are extensively described in U.S. Pat. No. 4,391,384 and include thermoplastic elastomers such as ethylene-propylene copolymers, polyethylene, ethylene copolymers, terpolymers and ionomers, polyvinyl chloride polymers, and styrene butadiene block copolymers. The materials are filled with chemical blowing agent or physical foaming agent so that when subject to the predetermined temperature, as discussed earlier, they will undergo considerable permanent volumetric expansion. In any event, the material should be capable of relatively large volumetric expansion when heated to a temperature in a range significantly above normal ambient temperatures but below the minimum temperatures experienced in a paint curing oven. The actual quantity and arrangement of the material required could, of course, be varied significantly, but should be selected such that when expansion takes place, the material is expanded sufficiently to move outwardly to a location wherein contact with the legs 14 is generally prevented. Additionally, however, in the unexpanded condition, it is preferable that the mass of material not extend beyond the maximum extent of the legs so that space required for storing the unused plugs is kept to a minimum. In order to reduce the amount of material required, the use of the depressed center portion 30 on the main body 12 is preferred.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A hole plug for closing an opening in a vehicle body member comprising:
   a main body for positioning in overlying relationship with a said opening;
   resilient retaining legs carried by the main body for extending through the said opening and engaging the sides of the opening for maintaining the main body in said overlying relationship, said legs extending a maximum distance D from the main body; and,
   a mass of heat expandable resilient material carried by the main body at a location adjacent the retaining legs, the heat expandable resilient material being capable of being expanded through the application of heat to permanently extend from the main body a distance greater than D.

2. The hole plug as defined in claim 1 wherein the main body has an outer periphery and the resilient retaining legs are located adjacent the outer periphery.

3. The hole plug as defined in claim 2 wherein the retaining legs are spaced relatively uniformly about the outer periphery of the main body.

4. The hole plug as defined in claim 2 wherein there is a single mass of the heat expandable resilient material located generally centrally of the retaining legs.

5. The hole plug as defined in claim 4 wherein the mass of heat expandable resilient material extends from the body a distance no greater than D until after it has been heat expanded.

6. The hole plug as defined in claim 1 including a resilient sealer gasket carried on the main body.

7. The hole plug as defined in claim 6 wherein the sealer gasket is formed from a heat responsive plastic that flows and adhesively bonds the plug in position when heated to a predetermined temperature level.

8. A hole plug for insertion in an opening in a panel for closing the opening, the plug comprising:
   a rigid main body having first and second oppositely facing surfaces meeting at a peripheral edge surface;
   a plurality of retaining legs extending from the second surface of the main body at spaced locations adjacent the peripheral edge surface;
   at least one mass of heat expandable resilient material carried on the second surface and capable of being permanently expanded by being raised to a predetermined temperature, the mass of heat expandable resilient material having a size and shape selected such that after expansion it extends outwardly from the second surface a distance greater than the retaining legs to thereby reduce the likelihood of contact between the legs and any adjacent structure.

9. A hole plug as defined in claim 8 wherein at least one of the legs is resilient and capable of deflecting in directions generally parallel to the second surface.

10. A hole plug as defined in claim 8 including a resilient sealer gasket joined to the main body for sealing about the peripheral edge surface.

11. A hole plug as defined in claim 10 wherein the resilient sealer gasket is joined to the first surface of the main body.

12. A hole plug as defined in claim 10 wherein the resilient sealer gasket extends outwardly of the first surface beyond the peripheral edge surface.

13. A hole plus as defined in claim 10 wherein the resilient sealer gasket is formed from a heat responsive plastic that flows and adheres to the main body when heated to a predetermined temperature.

14. A hole plug as defined in claim 8 wherein the main body has a dished center portion extending in the direction of said legs.

15. A hole plug as defined in claim 14 wherein each said retaining leg includes a plurality of retaining tabs located at different distances from the second surface.

16. A hole plug as defined in claim 14 wherein the mass of heat expandable resilient material is carried on the dished center portion.

* * * * *